(12) United States Patent
Chang et al.

(10) Patent No.: US 7,869,673 B2
(45) Date of Patent: Jan. 11, 2011

(54) REMOTE LARGER EFFECTIVE AREA OPTICAL FIBER

(75) Inventors: Do-Il Chang, Allen, TX (US); Andrej B. Puc, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 145 days.

(21) Appl. No.: 12/202,100

(22) Filed: Aug. 29, 2008

(65) Prior Publication Data

US 2010/0054660 A1 Mar. 4, 2010

(51) Int. Cl.
*G02B 6/28* (2006.01)
*H01S 3/00* (2006.01)

(52) U.S. Cl. .................. 385/24; 359/334; 359/341.4
(58) Field of Classification Search ............ 385/100, 385/122; 359/334; 398/79
See application file for complete search history.

(56) References Cited

U.S. PATENT DOCUMENTS

| 6,157,754 | A * | 12/2000 | Sasaoka et al. ........... 385/24 |
| 6,748,178 | B2 * | 6/2004 | Miyakawa et al. ........ 398/148 |
| 6,909,535 | B2 * | 6/2005 | Ueki ....................... 359/334 |
| 7,336,869 | B2 * | 2/2008 | Perrier et al. .............. 385/24 |
| 7,665,909 | B2 * | 2/2010 | Perrier et al. .............. 385/92 |
| 2006/0039664 | A1 * | 2/2006 | Bickham .................. 385/127 |

* cited by examiner

*Primary Examiner*—Rhonda S Peace
(74) *Attorney, Agent, or Firm*—Workman Nydegger

(57) ABSTRACT

Embodiments described herein relate to an optical fiber stretch that may experience forward Raman amplification in which the peak optical signal power occurs at some distance from the transmitter. Smaller effective area optical fiber is used at a portion of the optical fiber stretch in which the optical signal power is increasing, while larger effective area optical fiber is used at a more remote stretch of the optical fiber stretch that experiences the peak optical signal power. Thus, the quality of the signal is better preserved since the larger effective area fiber reduces maximum optical signal density thereby reducing non-linear degradations on signal quality.

23 Claims, 3 Drawing Sheets

REMOTE LARGER EFFECTIVE AREA OPTICAL FIBER

BACKGROUND

Fiber-optic communication networks serve a key demand of the information age by providing high-speed data between network nodes. Fiber optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Transmission of optic signals over such long distances presents enormous technical challenges. Significant time and resources may be required for any improvement in the art of long-haul and ultra-long-haul optical communication. Each improvement can represent a significant advance since such improvements often lead to the more widespread availability of communication throughout the globe. Thus, such advances may potentially accelerate humankind's ability to collaborate, learn, do business, and the like, regardless of where an individual resides on the globe.

BRIEF SUMMARY

Embodiments described herein relate to an optical fiber stretch that can be coupled between two nodes in an optical communication system. A proximate optical fiber portion is closer to the transmitting node, and is sufficiently close that if strong forward Raman amplification occurs, the optical signal power is strengthened within the length of the proximate optical fiber portion. At some point after the optical signal passes through the proximate optical fiber portion, the optical signal then passes through a more remote optical fiber portion.

This more remote optical fiber portion is positioned to correspond with a maximum peak optical signal power, but also has a larger effective cross-sectional area than the proximate optical fiber portion in which forward Raman amplification primarily occurs. Accordingly, even though the total optical signal power is higher within the more remote optical fiber portion, the optical power density is reduced due to the larger effective cross-sectional area of the more remote optical fiber portion. The reduction in optical signal power density in the larger effective area fiber results in less information loss due to non-linearity degradation at the peak optical signal power.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an optical fiber stretch may experience forward Raman amplification in which the peak optical signal power occurs at some distance from the transmitter. Smaller effective area optical fiber is used at a portion of the optical fiber stretch in which the optical signal power is increasing due to forward Raman amplification, while larger effective area optical fiber is used at a more remote optical fiber portion that experiences the peak optical signal power. Thus, even though some forward Raman amplification opportunity was lost due to the larger effective area fiber, the quality of the signal is better preserved since the larger effective area fiber reduces maximum optical signal density thereby reducing non-linear degradations on signal quality that are caused by high optical signal density.

Figure 1:
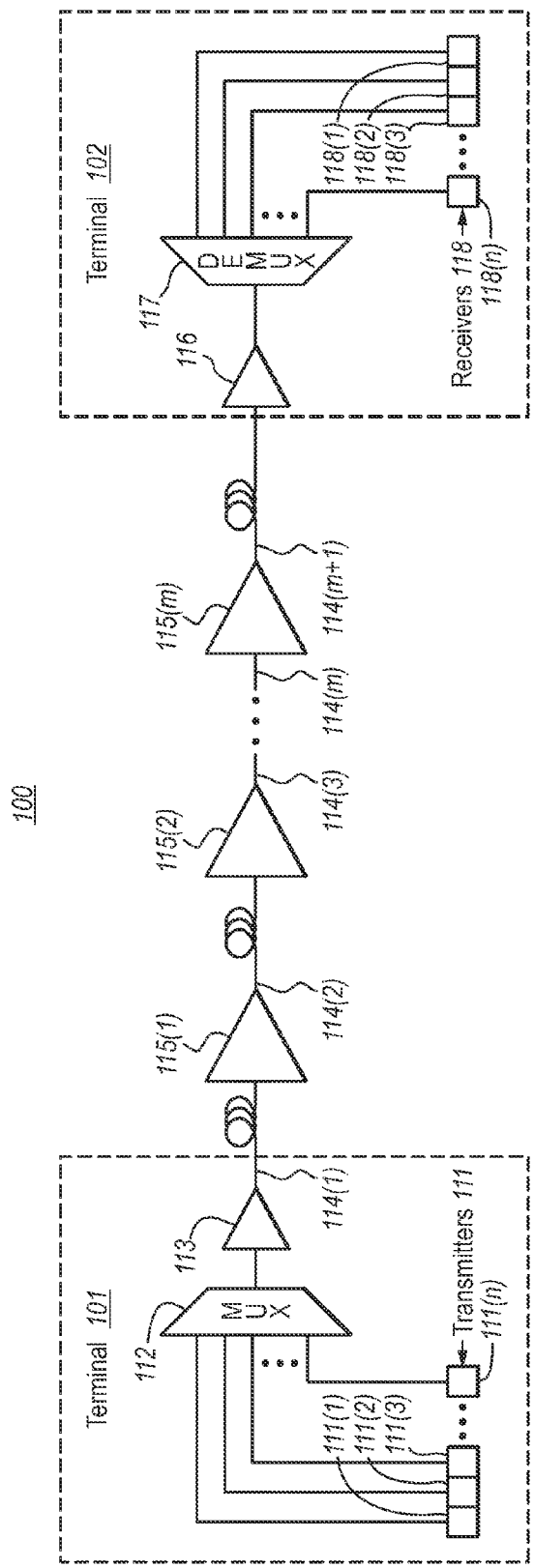
FIG. 1 schematically illustrates an example optical communications network including two optically communicating terminals.

FIG. 1 schematically illustrates an example optical communications system 100 in which the principles described herein may be employed. In the optical communications system 100, information is communicated from terminal 101 to 102 via the use of optical signals. For simplicity, although only one direction of optical communication will be described herein as communicating optical signals from terminal 101 to terminal 102, the communication system may (but need not) be bi-directional. In that case, perhaps a similar optical communication path may be used to communicate optical signals from the terminal 102 to the terminal 101.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "wavelength division optical channels". Each wavelength division optical channel is allocated a particular frequency for optical communication. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding wavelength division optical channel. The principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

The terminal 101 multiplexes each of the optical signals from the optical transmitters 111 into a single optical signal using optical multiplexer 112, which may then be optically amplified by an optional optical amplifier 113 prior to being transmitted onto a first fiber link 114(1).

There are a total of "m" repeaters 115 and "m+1" optical fiber links 114 between the terminals 101 and 102. In an unrepeatered optical communications system, "m" would be zero such that there is but a single fiber link 114(1) and no repeaters between the terminals 101 and 102. In a repeatered optical communications system, "m" would be one or greater. Each of the repeaters, if present, may consume electrical power to thereby amplify the optical signal.

The optical signal from the final optical fiber link 114(m+1) is then optionally amplified at the terminal 102 by the optional optical amplifier 116. The optical signal is then demultiplexed into the various wavelength division optical channels using optical demultiplexer 117. The various wavelength division optical channels may then be received and processed by corresponding optical receivers 118 including receivers 118(1) through 118(n).

The distance between repeaters will depend on the total terminal-to-terminal optical path distance, the data rate, the quality of the optical fiber, the loss-characteristics of the fiber, the number of repeaters (if any), and so forth. Experiment results are presented herein in which good quality signals are made possible even with an optical fiber link as high as 451 kilometers and even greater. That said, the principles described herein are not limited to any particular optical path distances between repeaters, nor are they limited to repeater systems.

The optical communications system 100 is represented in simplified form for purpose of illustration and example only. The principles described herein may extend to much more complex optical communications systems. The principles described herein may apply to optical communications in which there are multiple fiber pairs, each for communicating multiplexed WDM optical signals. Furthermore, the principles described herein also apply to optical communications in which there are one or more branching units that split one or more fiber pairs and/or wavelength division optical channels in one direction, and one or more fiber pairs and/or wavelength division optical channels in another direction.

Figure 2:
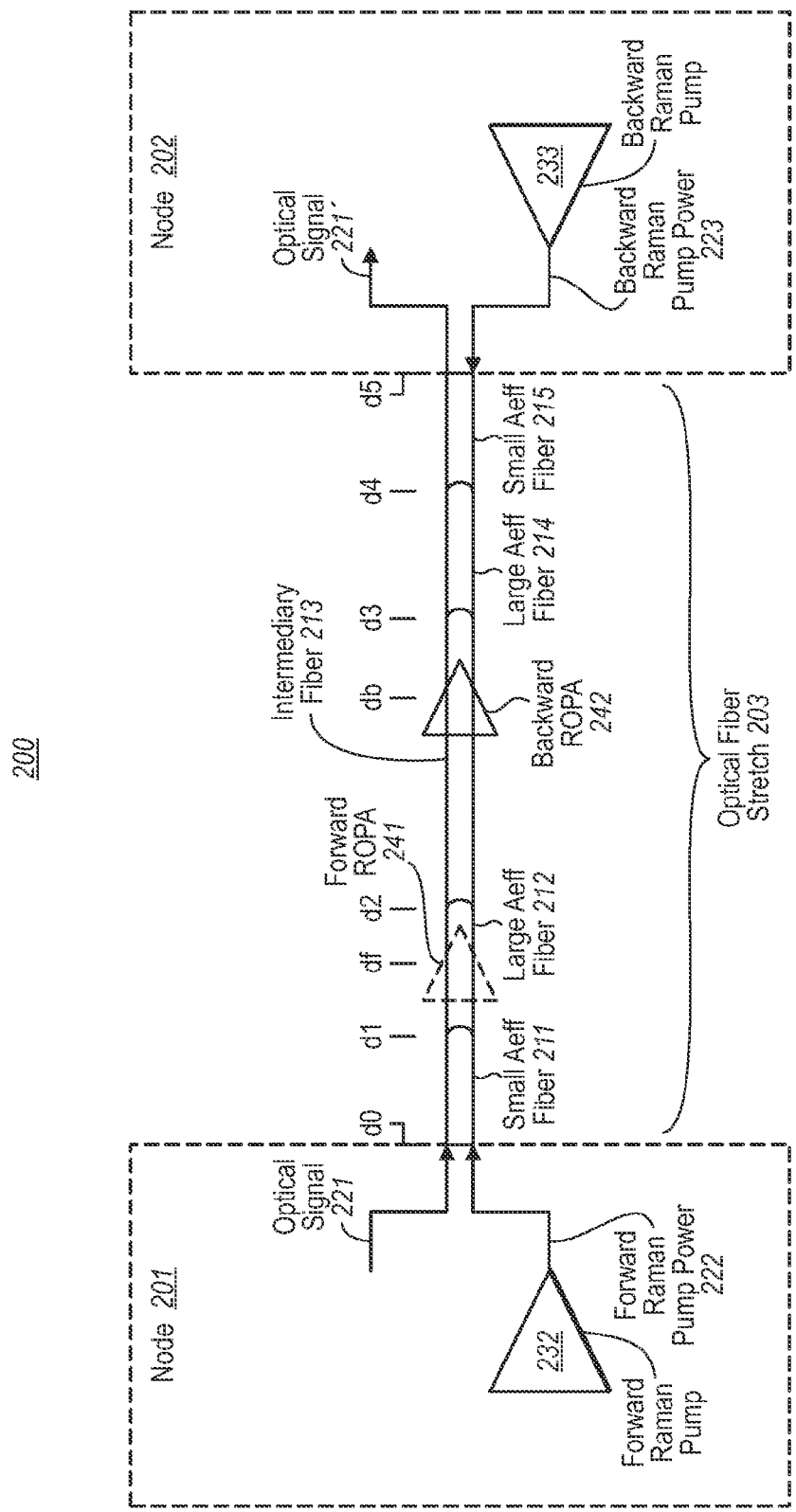
FIG. 2 schematically illustrates an optical link of the optical communications network of FIG. 1.

FIG. 2 illustrates an optical link 200 in an optical communications system. The optical link 200 optically communicates information from a first node 201 to a second node 202 using an optical fiber stretch 203. For example, if present in the optical communication system 100 of FIG. 1, the optical link 200 could be one of the optical fiber links 114(1) through 114(m+1) of the optical communications system 100.

If the optical communications system 100 were an unrepeatered system, then as previously stated, there is but one optical fiber link 114(1), and no repeaters 115 between terminals 101 and 102. In that case, the first node 201 would be the terminal 101 and the second node 202 would be the terminal 102. The optical fiber stretch 203 would be the single optical fiber link 114(1).

If the optical communications system 100 were a repeatered system, then there are several possibilities. First, the node 201 of FIG. 2 could be the terminal 101 of FIG. 1, with the node 202 being the first repeater 115(1), and the optical fiber stretch 203 being the optical fiber link 114(1). On the other end, the node 201 of FIG. 2 could be the final repeater 115(m), with the node 202 being the other terminal 102, and with the optical fiber stretch 203 being the final optical fiber link 114(m+1). If the number of repeaters were more than two (i.e., m>2), the node 201 could be repeater 115(k−1), the node 202 could be repeater 115(k), and the optical fiber stretch 203 could be optical fiber link 114(k), where k could be any integer between 2 and m, inclusive.

In this example, the node 201 serves as a transmitting node for the optical signal, and node 202 serves as a receiving node for the optical signal. Accordingly, in the remaining description, the node 201 may also be referred to as a "first node" or "transmitting node", and the node 202 may also be referred to as a "second node" or "receiving node". However, in bi-directional communication, nodes 201 and 202 may each also be receiving and transmitting nodes, respectively, for optical signals propagating in the opposite direction.

The node 201 sends optical signal 221 into the optical fiber stretch 203. In this specific example, the optical signal propagates in order through the proximate optical fiber portion 211, into a more remote optical fiber portion 212 that has a larger effective cross-sectional area, through an intermediary optical fiber portion 213, through another larger effective area remote optical fiber portion 214, through proximate optical fiber portion 215 and into the receiving node 202.

As with any of the other optical fiber portions 211 through 215 illustrated in FIG. 2, the optical fiber portions may be a single optical fiber segment, or perhaps a collection of one or more optical fiber segments that are spliced together either directly and/or through one or more optional optical components. If multiple optical fiber segments are used in a particular optical fiber portion, those segments may be of a single fiber type, or in some cases may be of different fiber types.

In the case of a single optical fiber type, the proximate optical fiber portion 211 might be any standard single mode fiber (SSMF) (effective cross sectional area (Aeff); 82~87 $\mu m^2$) or low loss pure silica core fibers such as Sumitomo Z fiber (Aeff; 76 $\mu m^2$) or Corning Vascade EX1000 (Aeff; 76 $\mu m^2$). Also in the case of a single optical fiber type, the more remote optical fiber portion 212 may be a Sumitomo Z-plus (also referred to as a Z+) fiber (Aeff; 110 $\mu m^2$) or Corning Vascade L1000 fiber (Aeff; 101 $\mu m^2$) or OFS SLA fiber (Aeff; 106 $\mu m^2$). The exact cross-sectional area of each of the optical fiber portions 211 and 212 is not critical. It one embodiment, the larger effective area optical fiber portion 212 may have at least ten percent (but more preferably at least thirty percent) more effective cross-sectional area than the optical fiber 211. For example, Z-plus optical fiber has at least forty percent more (44.7 percent to be more precise) effective cross-sectional area than Z fiber.

In the case of FIG. 2, each of the optical fiber portions 211 through 215 are illustrated as being contiguous with each other and with the transmitting node 201 and the receiving node 202. However, the optical fiber portions need not be contiguous in every case. If not contiguous, however, care should be taken such that intervening components of the optical path do not significant degrade the optical signal so as to obtain optical performance. There may be some circumstances where the use of intervening components may even be of an advantage, although just having contiguous optical fibers does have distinct advantages in ease of construction, cost, predictability of performance, and the lack of a need for additional electrical power along the length of the optical fiber stretch 203.

For instance, proximate optical fiber portion 211 is shown extending from the transmitting node 201 at distance d0 to distance d1. However, the principles described herein are not limited to there being no optical path components between the transmitting node 201 and the proximate optical fiber portion 211. In fact if there are optical components to be inserted into the optical fiber stretch, the interface between the optical fiber portions may be a good place to insert them. The more remote optical fiber portion 212 is shown extending from the proximate optical fiber portion 211 at distance d1 and another distance d2. However, there may also be intervening optical components between the proximate optical fiber portion 211 and the remote optical fiber portion 212. For instance, an optical isolator may be placed between the proximate optical fiber portion 211 and the remote optical fiber portion 212 to allow the optical signal and the forward Raman optical pump power to enter the remote optical fiber portion 212 from the proximate optical fiber portion 211, without having unwanted optical power propagating in the reverse direction to prevent multipath signal interference (MPI) penalty.

Each of the other interfaces other optical fiber portions (e.g., at d2, d2, d4 and d5) may also have intervening optical components in the optical path as well. For instance, at distance d4, another optical isolator may be placed in the optical path along with a pump bypass filter. The optical isolator prevents optical signal power from travelling backwards through the interface at d4 in the direction from the node 202 to the node 201. However, the pump bypass filter allows the backward Raman optical pump power to pass around the isolator so that backward Raman optical pump power from the node 202 is made available to the left of distance d4.

In one embodiment, the term "proximate" with respect to the optical fiber portion 211 means that the optical fiber portion 211 is either directly optically coupled to the transmitting node 201 or is at least within 5 kilometers in the optical path from the transmitting node 201. Furthermore, in one embodiment, the optical length of the proximate optical fiber is 10 kilometers or more. In any case, in one embodiment, the proximate optical fiber portion 211 has a length and position within the optical fiber stretch 203 such that forward Raman amplification (and preferably a majority of forward Raman amplification) occurs within the proximate optical fiber portion 211 due to the forward Raman pump power 222 injected into the optical fiber stretch 203 by the forward Raman pump 232.

In FIG. 2, the more remote optical fiber portion 212 is optically more remote than the proximate optical fiber portion 211 from the transmitting node 201, but is still positioned closer to the transmitting node 201 than the receiving node 202. The more remote optical fiber portion 212 extends from optical distance d1 to optical distance d2. The remote optical fiber portion 212 is structured to have a larger effective cross-sectional area as previously mentioned. In addition, the remote optical fiber portion 212 has an appropriate length and position within the optical fiber stretch 203 such that the more remote optical fiber portion experiences a maximum peak optical signal power of the optical signal.

Figure 3:
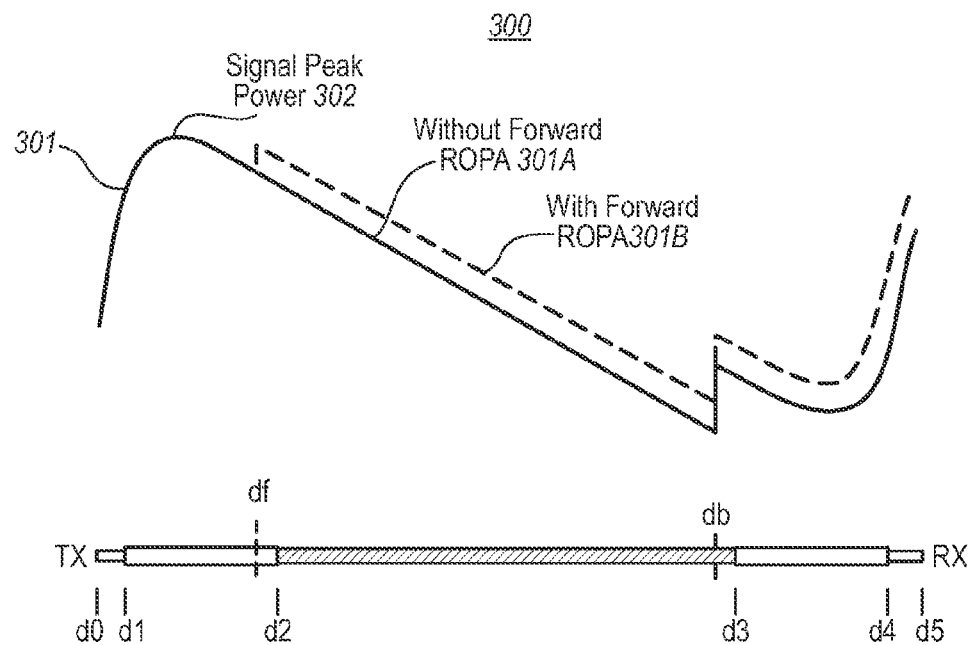
FIG. 3 illustrates an example optical signal power-distance profile diagram symbolically representing the power that an optical signal might have as it traverses the optical link of FIG. 2.

For instance, FIG. 3 illustrates an optical signal power-distance diagram 300 that shows an example signal power profile 301 of the optical signal as the optical signal propagates from distance d0 at the transmitting node to distance d5 at the receiving node. The principles described herein are not limited to an optical signal that has this power profile, and there is no representation herein that this example signal power profile 301 is drawn to scale. The optical signal power profile 301 is simply provided to illustrated basic concepts and not precise performance.

In FIG. 3, the span between distance d0 and d1 represents the proximate optical fiber portion 211 of FIG. 2. In this span, the optical signal power steadily increases due to forward Raman amplification. The span between distance d1 and d2 represents the more remote optical fiber portion 212 of FIG. 2. Within this span d1-d2, the optical signal power reaches its peak optical signal power.

In one embodiment, if the forward Raman optical pump power were 2.58 Watts, the proximate optical fiber portion 211 were Z fiber, and the more remote optical fiber portion 212 were Z-plus fiber, the distance d0 could be 0 kilometers, the distance d1 could be 20 kilometers, and the distance d2 could be 61 kilometers. However, while these optical distances are quite good for this configuration, further experimentation might reveal even better choices for distances even for this same configuration of forward Raman optical pump power and fiber selection. However, for a different forward Raman optical pump power and fiber selection, these distances could be adjusted accordingly during the design phase of the optical fiber stretch.

The remainder of the optical fiber stretch 203 extends from distance d2 to distance d5 at the receiving node 202. This stretch could be just a single stretch of homogenous optical fiber. For instance, a larger effective cross-sectional area optical fiber may extend the entire distance from distance d1 to distance d5 at the receiving node 202. That structure would have definite advantages in terms of ease of construction while retaining good quality of signal. For instance, a single larger effective cross-sectional area Z+ fiber may be used to extend from optical distance d2 to the receiving node 202. However, if backward Raman amplification were employed, perhaps the larger effective cross-sectional area would perhaps just extend from distance d1 to d4, such that more effective backward Raman amplification would occur within a smaller effective cross-sectional area optical fiber positioned between distances d4 and d5.

However, in the configuration of FIG. 2, the optical fiber stretch 203 has been made, in a way, "left-right" optically symmetric such that the optical signal would encounter the same fiber configuration no matter which side was connected to the transmitting node, and which side was connected to the receiving node. When ROPA is not used, it also makes assembly of the optical link more straightforward since there is not a requirement that a particular side of the optical fiber stretch 203 be connected to a particular node. Also, there is no chance that an error could occur in which side is connected to a particular node.

In one embodiment, the optical fiber stretch 203 is just one optical fiber stretch of multiple optical fiber stretches that are contained within a single cable that spans between nodes 201 and 202. In that case, perhaps the optical fiber stretch 203 is "up-down" symmetric, which means that for any given distances in the optical fiber stretch 203, the optical fiber type is the same across all optical fiber stretches. Thus, if one were to cut the cable regardless of where the cable was cut, one would find that at that cut portion, all of the optical fiber stretches have the same optical fiber type. This significantly simplifies the process of cable construction and repair since there are fewer cable types needed along the entire cable stretch.

In the embodiment of FIG. 2, there is a second proximate optical fiber portion 215 that is proximate the receiving node 202. This second proximate optical fiber portion 215 may be structured as described for the first proximate optical fiber portion 211. That is, suppose that the first proximate optical fiber portion 211 is Z fiber extending from the transmitting node 201 to a distance d1 of 20 kilometers in optical distance from the transmitting node 201. In that case, the second proximate optical fiber portion 215 may also be Z fiber extending from the receiving node 202 at distance d5 to a distance d4 of 20 kilometers in optical distance from the receiving node 202.

Also, for left-right symmetry, there is a second more remote optical fiber portion 214 that is optically more remote from the receiving node 202 than the second proximate optical fiber portion 215, but that is optically closer to the receiving node 202 than the transmitting node 201. This second more remote optical fiber portion 214 also has a larger effective cross-sectional area than the second proximate optical fiber portion 215. Additionally, although not required, this second more remote optical fiber portion 214 may be structured as described for the first more remote optical fiber portion 212. For instance, once again, suppose that the first more optical fiber portion 212 is Z-plus fiber extending from a distance d1 of 20 kilometers to a distance d2 of 61 kilometers in optical distance from the transmitting node 201. In that case, the second more remote optical fiber portion 214 may also be Z-plus fiber extending from a distance d4 of 20 kilometers to a distance d3 of 61 kilometers in optical distance from the receiving node 202. An additional benefit of the larger effective cross-sectional area fiber in portion d3-d4 would be that multipath signal interference (MPI) impairment would be reduced.

An intermediary optical fiber portion 213 is optically positioned between the more remote optical fiber portions 212 and 214. Since the remaining forward and backward Raman optical pump power 222 and 223 is very weak in the intermediary optical fiber portion 213, the effective cross-sectional area of the intermediary optical fiber portion 213 is not critical. Accordingly, to simplify installation and maintenance, the intermediary optical fiber portion 213 may be the same optical fiber type as the larger cross-sectional area optical fiber portions 212 and 214. The intermediary optical fiber portion 213 may also be a stretch of lower-effective area optical fiber such as, for example, Z fiber or standard single mode fiber.

Remote Optically Pumped Amplifiers (ROPAs) can optionally be located in large effective cross section area fiber portions 212 and 214, intermediary optical fiber portion 213 or at connection points d2 or d3. For instance, a backward ROPA 242 may be positioned within the intermediary optical fiber portion 213 at distance db in FIG. 3, and forward ROPA 241 may (preferably) be positioned within the larger effective cross-sectional area fiber 212 at distance df. If a forward ROPA 241 is present, it is advantageous to have the forward ROPA 241 within the more remote optical fiber portion 212 since the optical signal power is still generally high after amplification by the forward ROPA 241. Accordingly, the strong optical signal can still benefit from reduced non-linearity degradation offered by the larger effective cross-section area optical fiber portion 212. The backward ROPA can be placed anywhere in intermediary optical fiber portion 213, in the second more remote optical fiber portion 214, or in the interface therebetween. The optimal location will depend on the type and lengths of optical fiber used, and on the backward Raman pump power. The backward ROPA 242 is shown in solid-lined form, whereas the forward ROPA 241 is shown in dashed-lined form. This emphasizes that the backward ROPA 242 would provide much better amplification than would the forward ROPA 241 in most, if not all, practical configurations where forward and backward Raman amplification were employed. Nevertheless, both forward and backwards ROPAs may be employed as desired.

Returning to FIG. 3, if a forward ROPA 241 is present at distance df, the optical signal experiences a slight discrete gain of the optical power. The optical signal power-distance profile of the optical signal that was subjected to forward ROPA amplification is represented by dashed-lined profile 301B. On the other hand, the optical signal power-distance profile of the optical signal that was not subject to forward ROPA amplification is represented by the continuous solid-lined profile 301A.

The larger effective cross-sectional area optical fiber portion 212 would serve an additional purpose if a forward ROPA were employed. Specifically, since less forward Raman amplification occurs within the optical fiber portion 212 as would occur within an equivalent length of a smaller effective cross-section area fiber, more optical pump power from the forward Raman pump 222 is delivered to the forward ROPA, resulting in stronger amplification in the forward ROPA. Furthermore, by optimizing use of multiple pump wavelengths (e.g., 1400 nm~1490 nm), efficient transfer of pump power to the longest wavelength (1470~1490 nm) can be achieved to get more discrete gain in the forward ROPA.

Efficient transfer of pump power is just a side benefit of the more remote optical fiber portion 212 in the case a forward ROPA is used. The more substantial benefit previously described is that the larger effective area optical fiber portion 212 reduces non-linearity degradation by reducing the optical signal density where the optical signal reaches its maximum total optical power.

In FIG. 3, there is a backward ROPA used, and thus there is a discrete and significant gain at distance db. This gain is significant for several reasons. First, signal power in a backward ROPA region is much lower than in the forward region. Therefore, much more amplification can be achieved in the backward ROPA as compared to the forward ROPA given the same amount of pump power. Second, also due to the lower optical signal power, the rate of backward pump depletion by the Raman amplification is typically less than it is for forward Raman amplification. Accordingly, there is often much more residual backward Raman optical pump power available for a backward ROPA than there would be residual forward Raman optical pump power available for a forward ROPA.

Referring to FIG. 3, from distance db to distance d5, the optical signal profile 301 experiences backward Raman amplification. Referring to FIG. 2, this is due to the backward Raman pump 233 delivering backward Raman optical pump power 223 into the optical fiber stretch 203 counter-propagating against the optical signal 221' that emerges from the optical fiber stretch 203 into the receiving node 202.

Although not illustrated in FIG. 2, but as previously mentioned, to preserve optical channel integrity, optical isolators or isolator with pump bypass filter may be placed within the optical fiber stretch 203. This reduces multipath signal interference (MPI) impairment. The use of optical isolators, however, is well known and thus will not be described in detail here.

Figure 4:
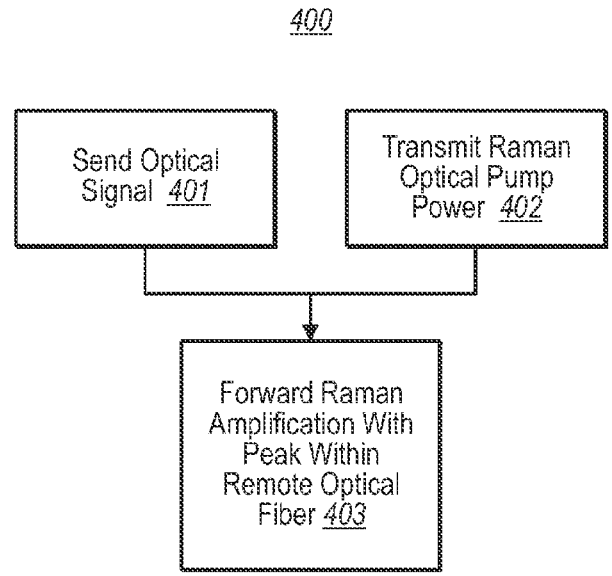
FIG. 4 illustrates a flowchart of a method for using the optical link of FIG. 2.

FIG. 4 illustrates a simple flowchart of a method 400 for using an optical fiber stretch for communication from a first node to a second node in an optical communications system, and may be performed using the optical link 200 of FIG. 2. The optical signal is sent into the optical fiber stretch from the first node (e.g., node 201) towards the second node (e.g., node 202) (act 401). In addition, forward Raman optical pump power is transmitted into the optical fiber stretch in the same direction (act 402). This causes forward Raman amplification of the optical signal within the optical fiber stretch (act 403). The Raman optical pump power is sufficient that peak optical signal power occurs remotely within the optical fiber stretch (e.g., within the optical fiber portion 212).

The following Table 1 illustrates some actual experimental results obtained under a certain set of conditions. The set of specific experimental conditions is not intended to in any way limit the scope of the invention. Rather, the experimental results are provided merely to illustrate how the principles described herein may be used to improve the Quality-factor (Q-factor) of an optical signal under at least one set of conditions.

TABLE 1

| Wavelength | CH | Case A | | | Case B | | |
|---|---|---|---|---|---|---|---|
| | | OSNR [dB] | BER | Q | OSNR | BER | Q |
| 1576.6 | 98 | | 1.8E−04 | 11.0 | | 7.1E−05 | 11.6 |
| 1575.8 | 100 | | 1.4E−04 | 11.2 | | 8.8E−05 | 11.4 |
| 1575.0 | 102 | | 2.5E−04 | 10.8 | | 1.2E−04 | 11.3 |
| 1574.1 | 104 | | 2.4E−04 | 10.8 | | 1.6E−04 | 11.1 |
| 1573.3 | 106 | | 6.5E−05 | 11.6 | | 3.8E−05 | 11.9 |
| 1572.5 | 108 | | 1.3E−04 | 11.2 | | 6.0E−05 | 11.7 |
| 1571.7 | 110 | | 1.9E−04 | 11.0 | | 1.0E−04 | 11.4 |
| 1570.8 | 112 | | 1.4E−04 | 11.2 | | 7.3E−05 | 11.5 |
| | AVE. | 15.5 | | 11.1 | 15.2 | | 11.5 |

The experiment was conducted testing two cases called hereinafter and referred to in the table as "Case A" and "Case B". In both cases, the following conditions were applied:

1) the total optical distance of the optical path is 451 kilometers from the transmitting node to the receiving node;

2) a backward Remote Optically Pumped Amplifier (ROPA) was placed in the optical path 132 kilometers from the receiving node in the optical path;

3) the same backward ROPA was used in both cases;

4) a forward Raman pump was used with the forward optical pump power of 2.58 Watts;

5) a backward Raman pump was used with the backward optical pump power of 2.24 Watts;

6) no forward ROPA was used;

7) 8 Channels were tested for, all in the lower L-band including channels ranging from approximately 1570.8 nanometers to 1576.6 nanometers;

8) an optical isolator was used 20 kilometers from the transmitting node in the optical path;

9) an optical isolator with pump bypass filter was used 20 kilometers from the receiving node in the optical path; and 10) active dispersion compensation was used.

Note that a physical stretch of 451 kilometers of optical fiber can be coiled into a relatively small space, and thus this type of testing is feasible in an enclosed area such as a room. Accordingly, where distances are mentioned herein, it is the optical distance that is important. The nodes 201 and 202 of FIG. 2 may be hundreds of kilometers apart optically, but yet be physically situated right next to each other for experimental testing. The optical performance of the link would tend to be the same regardless of whether the nodes 201 and 202 were physically right next to each other, or stretched out traversing a significant portion of the topography of the Earth.

Once again, for purposes of this experiment only, for Case A, the entire 451 kilometer length was Z fiber having a constant effective cross-sectional area of 76 $\mu m^2$. For Case B, one of the enumerable embodiments of the principles described herein was employed. For example, the fiber length had the following composition:

1) From 0 to 20 kilometers from the transmitting node, there is Z fiber that has an effective cross-sectional area of 76 $\mu m^2$;

2) From 20 to 56 kilometers from the transmitting node, there is Z-Plus fiber that has an effective cross-sectional area of 110 $\mu m^2$; and 3) The remainder of the optical fiber stretch from 56 kilometers all the way to 451 kilometers from the transmitting node (i.e., all the way to the receiving node) is Z fiber.

Table 1 reveals some counterintuitive results, although the results would make more sense to one of ordinary skill in the art after having read and understood this description. In Case B, the use of a larger effective area fiber does reduce the amount of forward Raman amplification that occurs. Accordingly, the Optical Signal to Noise Ratio (OSNR) is higher for case A (i.e., 15.5) than for case B (i.e., 15.2). A higher OSNR often, if not usually, correlates to a better signal. However, in the case of Table 1, the Quality-factor (Q) which exactly correlates to signal quality is higher in Case B (i.e., 11.5) than for Case A (i.e., 11.1). This is due to the use of the larger effective area optical fiber to propagate the optical signal as the optical signal peaks. The larger effective area optical fiber lowers the optical power density as compared to what it would otherwise be, thereby avoiding non-linearity signal degradation. Note that the Q-factor of 11.5 is still higher than it needs to be for some applications, suggesting that even longer fiber stretches are possible, especially if the Raman optical pump power is altered and/or further compositions of optical fiber stretches consistent with the principles described herein are experimented with.

It should be noted that even though a 36 kilometer stretch of Z-plus fiber was used from 20 to 56 kilometers, perhaps an even longer stretch might yield better results. The length of 36 kilometers was only selected due to the ready availability of that length of fiber at the time of the experiment. For instance, in implementation, a Z-plus fiber might be used from 20 to 61 kilometers from the transmitting end, although there is no assertion herein that even that is the best configuration. Furthermore, as the forward Raman pump power is altered, the position of the peak optical signal power will change along with the entire optical signal distance profile. Accordingly, the optimal position of the larger effective area fiber portion might change as well. A variety of other factors might affect the optimal length and position of the larger effective area fiber portion.

Accordingly, the principles provided herein provide the potential for improved quality of signal over long haul and ultra long haul optical communication links that employ forward Raman distributed amplification in which the peak optical signal occurs remotely from the transmitting node in the optical link.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical fiber stretch that defines an optical path from a first node to a second node in an optical communication system, the optical fiber stretch comprising:

a proximate optical fiber portion that is proximate the first node when a first end of the optical fiber stretch is optically coupled to the first node;

a more remote optical fiber portion that is more remote in the optical path from the first node than the proximate optical fiber portion, but that is still closer to the first node than the second node when a second end of the optical fiber stretch is optically coupled to the second node;

wherein the effective cross-sectional area of the more remote optical fiber portion is more than the effective cross-sectional area of the proximate optical fiber portion, and wherein the length of the proximate optical fiber portion is selected such that when forward Raman amplification is applied at the first node, a signal propagating from the first node towards the second node reaches peak optical signal power due to the forward Raman amplification in the more remote optical fiber.

2. An optical fiber stretch in accordance with claim 1, wherein the effective cross-sectional area of the more remote optical fiber portion is more than the effective cross-sectional area of the proximate optical fiber portion by at least 10 percent.

3. An optical fiber stretch in accordance with claim 1, wherein the proximate optical fiber portion includes one or more optical fiber segments.

4. An optical fiber stretch in accordance with claim 1, wherein the more remote optical fiber portion includes one or more optical fiber segments.

5. An optical fiber stretch in accordance with claim 1, wherein when the first end of the optical fiber stretch is optically coupled to the first node, the proximate optical fiber portion is optically positioned between a first optical distance from the first node along the optical channel and a second optical distance from the first node along the optical channel, the first optical distance being equal to or greater than zero, and the second optical distance being greater than the first optical distance, and wherein the more remote optical fiber portion is optically positioned between a third optical distance from the first node along the optical channel and a fourth optical distance from the first node along the optical channel, the third optical distance being equal to or greater than the second optical distance, and the fourth optical distance being greater than the third optical distance.

6. An optical fiber stretch in accordance with claim 5, wherein the first optical distance is 5 kilometers or less.

7. An optical fiber stretch in accordance with claim 6, wherein the optical distance between the first and second optical distances in 10 kilometers or more.

8. An optical fiber stretch in accordance with claim 7, wherein the second and third optical distances are the same such that the more remote optical fiber portion is connected to the proximate optical fiber portion.

9. An optical fiber stretch in accordance with claim 7, wherein the optical distance between the third optical distance and the fourth optical distance is at least 20 kilometers.

10. An optical fiber stretch in accordance with claim 1, further comprising:

a backward remote optically pumped amplifier optically positioned more proximate the second end than the first end of the optical fiber stretch.

11. An optical fiber stretch in accordance with claim 1, further comprising:

a forward remote optically pumped amplifier optically positioned more proximate the first end than the second end of the optical fiber stretch.

12. An optical fiber stretch in accordance with claim 1, wherein the proximate optical fiber portion is a first proximate optical fiber portion, and the more remote optical fiber portion is a first more remote optical fiber portion, the optical fiber stretch further comprising:

a second proximate optical fiber portion that is proximate the second node when the second end of the optical fiber stretch is optically coupled to the second node; and a second more remote optical fiber portion that is more remote in the optical path from the second node than the second proximate optical fiber portion, but that is still closer to the second node than the first node when the first end of the optical fiber stretch is optically coupled to the first node;

wherein the effective cross-sectional area of the second more remote optical fiber portion is more than the effective cross-sectional area of the second proximate optical fiber portion, but is approximately the same as the effective cross-sectional area of the first more remote optical fiber portion.

13. An optical fiber stretch in accordance with claim 12, further comprising:

a backward remote optically pumped amplifier optically positioned more proximate the second end than the first end of the optical fiber stretch.

14. An optical fiber stretch in accordance with claim 13, further comprising:

a forward remote optically pumped amplifier optically positioned more proximate the first end than the second end of the optical fiber stretch.

15. An optical fiber stretch in accordance with claim 12, further comprising:

a forward remote optically pumped amplifier optically positioned more proximate the first end than the second end of the optical fiber stretch.

16. An optical fiber stretch in accordance with claim 12, wherein the optical fiber stretch is left-right optically symmetric.

17. An optical fiber stretch in accordance with claim 12, wherein the optical fiber stretch is up-down optically symmetric.

18. An optical fiber stretch in accordance with claim 12, further comprising:

an intermediary optical fiber portion positioned between the first and second more remote optical fiber portions.

19. An optical link for communication between a first node and a second node in an optical communications system, the optical link comprising:

an optical fiber stretch having an optical path that couples the first and second nodes and that is defined primarily by one or more optical fiber segments;

a forward Raman pump configured to transmit Raman optical pump power into the optical fiber stretch from the first node to thereby cause forward Raman amplification of the optical signal within the optical fiber stretch, wherein the Raman optical pump power is sufficient that peak optical signal power occurs remotely within the optical fiber stretch, wherein the optical fiber stretch is structured such that, at a proximate optical fiber portion closer to the first node, forward Raman amplification occurs due to the forward Raman pump such that the optical signal gains in strength with distance from the first node, wherein the optical fiber stretch is further structured such that a more remote optical fiber portion experiences a maximum peak optical signal power of the optical signal due to the forward Raman amplification, the more remote optical fiber portion being 1) further in the optical path from the first node than the proximate optical fiber portion, 2) closer in the optical path to the first node than the second node, and 3) of a greater effective cross-sectional area than the proximate optical fiber portion.

20. An optical link in accordance with claim 19, wherein the proximate optical fiber portion is selected such that a majority of the Raman optical pump power is consumed in forward Raman amplification within the proximate optical fiber portion.

21. A method for using an optical fiber stretch for communication from a first node to a second node in an optical communications system, the method comprising:

an act of sending an optical signal into the optical fiber stretch from the first node towards the second node;

an act of transmitting Raman optical pump power into the optical fiber stretch to thereby cause forward Raman amplification of the optical signal within the optical fiber stretch, wherein the Raman optical pump power is sufficient that peak optical signal power occurs remotely within the optical fiber stretch, wherein the optical fiber stretch includes a proximate optical fiber portion that is proximate the first node, and a more remote optical fiber portion that is more remote from the first node than the proximate optical fiber portion, wherein the more remote optical fiber portion is positioned such that a peak optical signal power due to the forward Raman amplification occurs within the more remote optical fiber portion, wherein the effective cross-sectional area of the more remote optical fiber portion is more than the effective cross-sectional area of the proximate optical fiber portion.

22. A method in accordance with claim 21, wherein the act of transmitting an optical signal comprises an act of transmitting the optical signal such that at least a majority of the optical signal power is in the L-band.

23. A method in accordance with claim 21, wherein the effective cross-sectional area of the more remote optical fiber portion is more than the effective cross-sectional area of the proximate optical fiber portion by at least ten percent.

* * * * *